2,769,847

CATALYSTS FOR THE HYDRATION OF OLEFINES AND DEHYDRATION OF ALCOHOLS

Ralph Lozelu Robinson, Norton-on-Tees, England, assignor to Imperial Chemical Industries Limited, a corporation of Great Britain No Drawing. Application September 22, 1952, Serial No. 310,923

Claims priority, application Great Britain October 3, 1951

9 Claims. (Cl. 260—641)

This invention relates to catalysts suitable for the hydration of olefines.

According to the present invention there is provided a catalyst suitable for the hydration of olefins, the said catalyst comprising an intimate admixture of titania and ferric oxide, the proportion of ferric oxide being from 1 to 90 moles per 100 moles of admixture.

The expression "intimate admixture" is intended to indicate an admixture which is closer than that which could be obtained by mechanically mixing the two constituents.

According to one method for producing the catalyst disclosed in the present invention, titania gel and a solution of a ferric salt decomposable by heat, such as ferric nitrate, may be mixed together, the mixture evaporated to dryness and subsequently calcined, whereby there is obtained a product comprising titania and ferric oxide. If desired the product may be granulated and/or pelleted.

According to a second method of producing ferric oxide-titania catalysts, ferric hydroxide gel, either dried or freshly prepared, may be mixed with titanium tetrachloride, and the mixture hydrolysed with a basic substance, for example by the addition of ammonia, to give a mixture of hydrated titania and ferric hydroxide gel. These hydrated oxides may be separated by filtration or decantation, dried, calcined in order to remove a substantial proportion of the water content, and, if desired, granulated and/or pelleted prior to use.

In a third method of producing ferric oxide-titania catalysts, a mixture of titanium and iron compounds, for example a mixture of ferric chloride and titanium tetrachloride may be hydrolysed, for example by the addition of ammonia, to give mixed hydrated oxides of iron and titanium. These mixed hydrated oxides may be separated by filtration or decantation, dried, ignited to remove a substantial proportion of the water content, and if desired granulated and/or pelleted prior to use.

Catalysts produced by the process of the present invention may be employed in batch or continuous processes for the direct hydration of olefins to alcohols. For example, they may be employed in the direct hydration of propylene to isopropanol. This reaction is preferably carried out at a temperature within the range of 250° to 330° C. and under a pressure of 150 to 500 atmospheres; in particular it is preferable to employ a temperature of 270° C. and a pressure of 250 atmospheres.

In co-pending Dennis A. Dowden application Serial No. 312,174, filed September 29, 1952, catalysts suitable for use in hydration and/or dehydration reactions are provided, the said catalysts comprising two or more oxides, the oxide constituting a minor proportion of the said catalyst being derived from an element of higher valency than the metallic element present in the major oxide constituent, and the major oxide constituent comprising at least 90 moles per 100 moles of catalyst.

Example 1

Dry ferric oxide gel was mixed with titanium tetrachloride and the product treated with steam whereby there was obtained an intimate mixture of ferric hydroxide gel and titania gel. The amount of dry ferric hydroxide gel employed was such that the molar ratio $Fe_2O_3:TiO_2$ in the product was 82:18. The product was calcined at 600° C. and pelleted. This catalyst was then tested in the hydration of propylene to isopropanol.

650 mls. of water were added to an autoclave having a volume of 1300 mls. 100 mls. of catalyst were suspended in a wire basket in the autoclave in a manner such that part of the wire basket was immersed in the water. Propylene was admitted to the autoclave until the pressure was 250 atmospheres and the autoclave was then heated to 270° C. for four hours. The product from this reaction contained 6.6% by weight of isopropanol.

Example 2

Wet ferric hydroxide gel was suspended in a solution of titanium tetrachloride and the mixture treated with ammonium hydroxide whereby there was obtained an intimate admixture of ferric hydroxide gel and titania gel. The quantities of reactants employed were such that the molar ratio of $Fe_2O_3:TiO_2$ was 82:18. The product was dried, calcined at 400° C., granulated and pelleted.

The catalyst prepared in this manner was tested under the conditions described in Example 1 in the hydration of propylene to isopropanol. The product contained 3.3% by weight of isopropanol.

I claim:

1. A catalyst suitable for the hydration of olefines, the catalyst consisting essentially of an intimate admixture of titania and ferric oxide, the proportion of ferric oxide being between 1 and 90 moles per 100 moles of admixture.

2. A process of preparing a catalyst suitable for the hydration of olefines comprising the steps of mixing titania gel with a solution of a ferric salt decomposable by heat in such proportions as to give a final mixture of ferric oxide and titania in which the ferric oxide is between 1 and 90 mols per 100 mols of the mixture, evaporating the mixture to dryness and subsequently subjecting it to calcination.

3. A process of preparing a catalyst suitable for the hydration of olefines comprising the steps of mixing ferric oxide gel with titanium tetrachloride in such proportions as to give a final mixture of ferric oxide and titania in which the ferric oxide is between 1 and 90 mols per 100 mols of mixture, and hydrolyzing the mixture with a basic substance to give an intimate mixture of hydrated titania and ferric hydroxide gel.

4. A process of preparing a catalyst suitable for the hydration of olefines comprising the step of hydrolyzing a mixture of titanium and ferric salts to give an intimate mixture of hydrated ferric oxide and hydrated titania, the titanium and ferric salts being used in such proportions as to give a final mixture of ferric oxide and titania in which the ferric oxide is between 1 and 90 moles per 100 mols of mixture.

5. A process of hydrating an olefine to produce an alcohol comprising reacting the olefine with water in the presence of a catalyst consisting essentially of an intimate admixture of titania and ferric oxide, the proportion of ferric oxide being between 1 and 90 mols per 100 mols of the mixture.

6. The process of claim 5, wherein reaction is carried out at a temperature between about 250 and 330° C. and a pressure of between about 150 and 500 atmospheres.

7. The process of claim 5, wherein the olefine is propylene.

8. The process of claim 7, wherein the reaction is carried out at a temperature between about 250 and 330° C. and a pressure of between about 150 and 500 atmospheres.

9. A process of hydrating propylene to produce isopropanol consisting of reacting the propylene with water in the presence of a catalyst consisting of an intimate admixture of titania and ferric oxide, the proportion of ferric oxide being between 1 and 90 mols per 100 mols of the mixture, said reaction being carried out at a temperature of about 270° C. and a pressure of about 250 atmospheres.

References Cited in the file of this patent

UNITED STATES PATENTS

| | | |
|---|---|---|
| 1,219,277 | Farup | Mar. 13, 1917 |
| 1,907,317 | Brown et al. | May 2, 1933 |
| 2,322,622 | Fischer et al. | June 22, 1943 |
| 2,694,049 | Reynolds et al. | Nov. 9, 1954 |

FOREIGN PATENTS

| | | |
|---|---|---|
| 650,475 | Great Britain | Feb. 28, 1951 |
| 651,275 | Great Britain | Mar. 14, 1951 |

OTHER REFERENCES

Berkman et al.: Catalysis, Reinhold Publ. Corp. (1940) pp. 656, 732, 733, 734.